Feb. 7, 1950  J. F. BACHMANN  2,496,259
MONITORING CIRCUIT
Filed Nov. 21, 1946 2 Sheets-Sheet 1

INVENTOR.
JOHN F. BACHMANN
BY
ATTORNEY

INVENTOR.
JOHN F. BACHMANN
BY
ATTORNEY

Patented Feb. 7, 1950

2,496,259

UNITED STATES PATENT OFFICE 2,496,259

MONITORING CIRCUIT

John F. Bachmann, Nutley, N. J., assignor to Federal Telephone and Radio Corporation, New York, N. Y., a corporation of Delaware Application November 21, 1946, Serial No. 711,457

10 Claims. (Cl. 250—17)

My invention relates to monitoring circuits, particularly to means for indicating abnormalities of modulated, carrier waves.

It is often desirable to convey to an operator, information of the strength of a carrier wave as well as the modulating wave at a remote transmitter. The control tower at an airport, for example, may require such information from the beacon transmitters ranged about the field. Radio beacons, glide path transmitters, compass transmitter, and the like must not only radiate the carrier wave with voltages between limits of, say, 50 percent and 300 percent of normal, but must properly modulate those carriers with keyed or tone signals. Any monitoring system, accordingly, must be sensitive to failures or abnormalities of certain components of the modulated carrier since instrument landing systems can tolerate no misinformation from any of the stations.

An object of my invention is a monitoring system which is sensitive to abnormal carrier and modulating voltages.

A specific object of my invention is a monitoring system which will indicate a carrier wave, the modulations of which have failed or have varied beyond predetermined limits of voltage.

My novel monitoring system comprises means for demodulating a portion of the output of the transmitter to be monitored. The derived signal is then impressed upon two parallel detector circuits, one having a short time constant and the other having a long time constant. A current limiting device is connected to the latter detector circuit to bend the otherwise straight-line input-output characteristic of the long time constant detector. The output voltages of the two detectors are subtracted, one from the other, and applied to the control grid of a gas tube. The difference voltage thus obtained, and the control grid voltage, is found to rise to a maximum and to then decrease as the input voltage increases over a considerable range. The control grid voltage, then, may be reduced below ignition value for either high or low signal voltages, or for failure of modulations. The output of the gas tube is relayed to appropriate indicators which in the case of airport installations are located at the control tower.

My invention, however, is defined with greater particularity in the appended claims and a preferred embodiment thereof is described in the following specification and shown in the following drawing in which:

Figure 1:
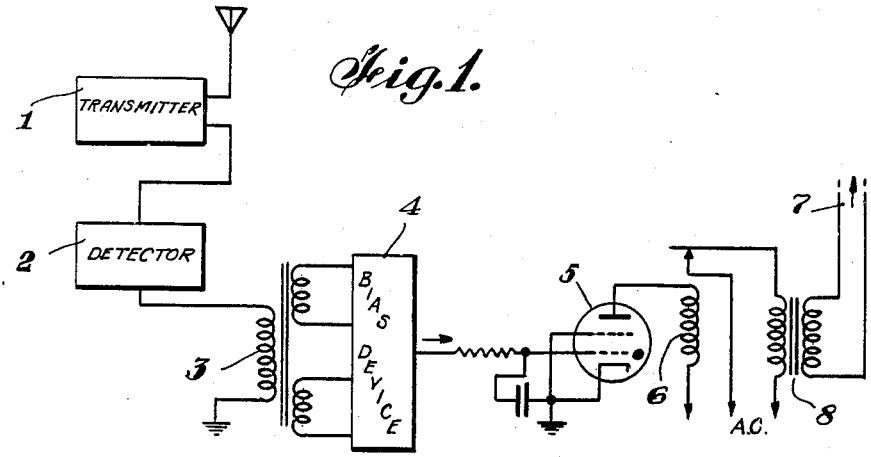
Fig. 1 shows, by block diagram, an example of a transmitter to which my novel monitoring circuits may be applied.

It will become apparent as the following description proceeds that the transmitter to which my invention is shown to be applied, may in fact be any source of modulated carrier waves for radio or wired transmission. To the output circuit of the transmitter 1, is coupled a detector 2 as shown in Fig. 1, the output of the detector being coupled by transformers 3 to the bias device 4, shown in detail in Fig. 2. The output of the bias device is a direct current voltage which is applied to the control grid of the gas tube 5, which in turn operates the electro-mechanical relay 6 to control the transmission of a low voltage alternating current over the line 7 to the monitoring indicators, which may be located near or far. The low voltage, say 6 volts, is obtained by the step-down transformer 8 from commercial 110 volt-60 cycle power. Means for receiving and visually and audibly indicating at the monitoring station the signals on the lines is described in detail in the co-pending application of W. S. Thompson, Serial No. 710,025 filed November 15, 1946, and assigned to the assignee of this application now abandoned. It is preferred that the low voltage signal appear on the line when the transmitter is operating normally and that the signal disappear the instant the carrier wave strength becomes too high or too low, or when the modulations on the carrier fail or vary from normal.

Figure 2:
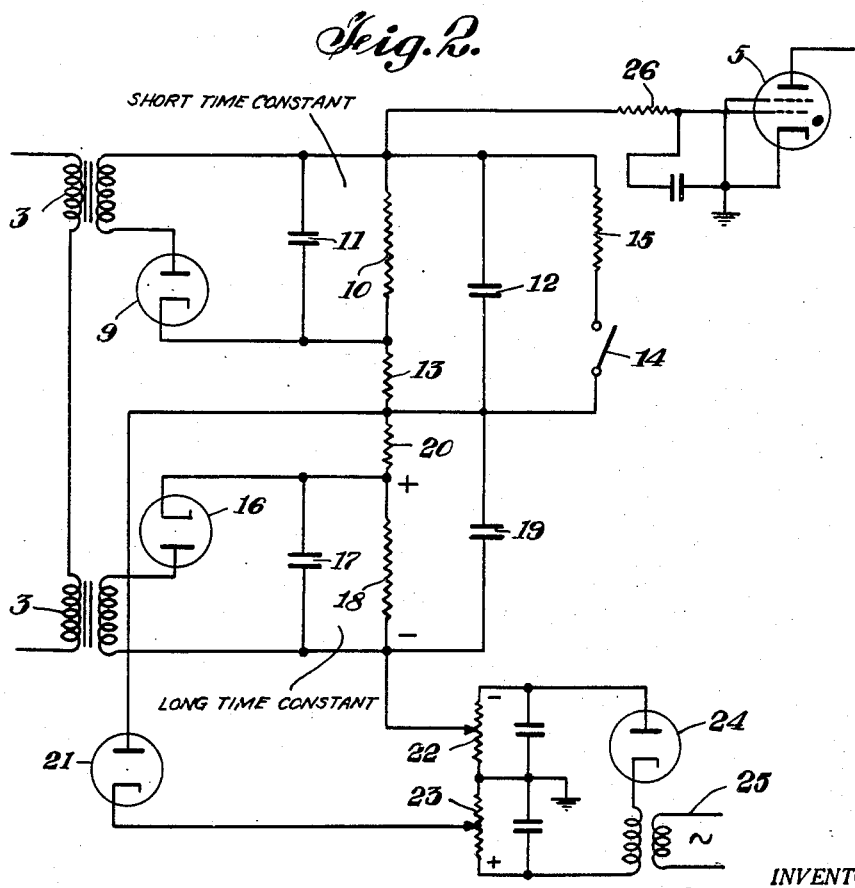
Fig. 2 is a wiring diagram of the essential circuits of my novel modulated carrier wave monitoring circuit.
Figure 3:
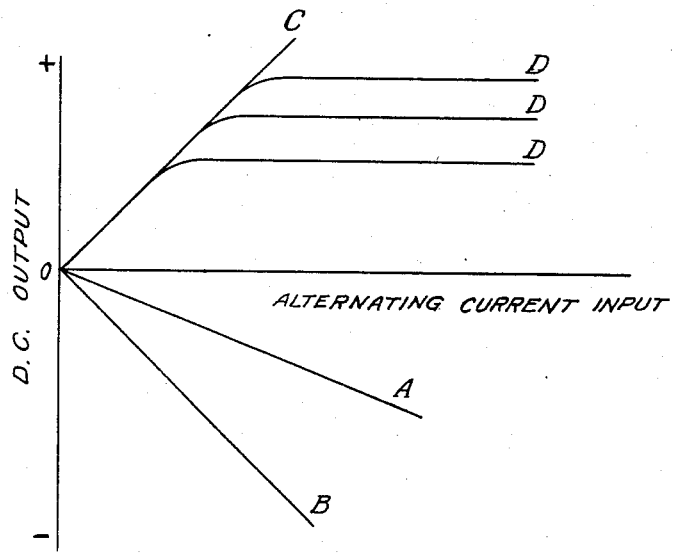
Figs. 3 and 4 are graphs showing the functional relation of input alternating current and output direct current of the detectors of my device.

The bias device, shown in detail in Fig. 2 is sensitive to the mentioned abnormalities in either the carrier or the modulations. The demodulated signal, usually an audible tone, is applied directly to the diode detector tube 9 by the coupling transformer 3. The rectified space current of the diode flows in the parallel circuits of the resistor 10 and condenser 11 which for reasons that will appear has a sufficiently short time constant with respect to the modulation frequency that pulsations of that frequency will appear across the resistor 10. The filter network, comprising condenser 12 and resistor 13 of large values, are serially connected across the time constant circuit so that the voltage across the network is steady and proportional to the average modulation voltage at the transformer 3. If the carrier is modulated as by keying so that carrier voltage is intermittent or pulsating, the direct current voltage across the filter network will, of course, be less than if the carrier voltage is steady. These voltages have simple linear relations and may be graphically represented by the straight lines A and B, Fig. 3. That is, when the normal input to the transformer is keyed the direct current voltage across condenser 12 follows line A, but if keying fails, the voltage across 12 increases and follows line B. Should it be desired that the normal input to the transformer be an unkeyed signal, the switch 14 may be closed to place resistance 15 across the filter network, to reduce the direct current voltage, and to cause it to follow line A.

A second detector comprising diode 16, condenser 17 and resistor 18 is also coupled by transformer 3 to the signal source, the time constant however being relatively long so that the direct current voltage across resistor 18 will change only with long-time changes of the carrier. A filter network comprising condenser 19 and resistor 20 and similar to filter 12—13 is connected across the second detector. The D.-C. output A.-C. input relation of the second detector may be represented by line C, Fig. 3. However, the diode 21 may be connected across the output of the second detector and polarized to limit the rise of the second detector output voltage so that the output voltage levels off according to curve D. The voltage at which curve D levels out is determined by the steady bias voltage supplied between the sliders of potentiometers 22 and 23. The current through the potentiometer may be supplied by a battery or by the rectifier 24 and an alternating current source 25.

Figure 4:
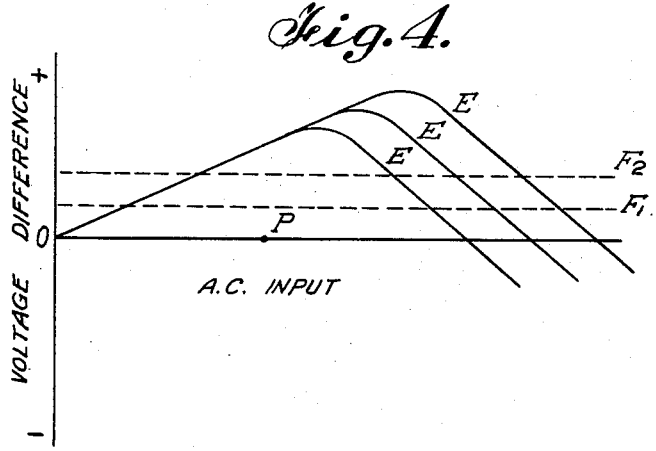

When the outputs of the two detectors are serially connected and are oppositely polarized as shown, the voltage across the two outputs is a difference voltage and may be graphically represented by adding the value of curve A to curve D. This voltage, shown by curve E, Fig. 4, is the voltage that appears at the control grid of the gas tube 5.

The gas tube cathode is grounded and the center of the bias source is grounded so that the required voltage from the detectors to ignite a discharge may conveniently be shifted up or down. Lines $F_1$, $F_2$, etc. may indicate the gas tube threshold or ignition voltage.

It now appears that since curve E crosses curve F in two places, there are two values of input alternating voltage beyond which the difference voltage drops below ignition voltage F, and if the alternating input voltage becomes too high or too low the gas tube discharge is extinguished. All voltages below F on E keep the gas tube from firing, while all voltages above F on E ignite a discharge. With any given alternating current input voltage, as point P, resistor 22 may be adjusted to shift curve F so that the gas tube does not fire below any selected percentage of the input voltage. Also by adjusting resistor 23, the knee of curve D can be shifted so that the gas tube does not fire above any selected percentage of the input voltage.

If in normal operation the transmitter is keyed and the switch 14 of the bias device is open, failure of keying will cause an increase in the voltage across 10, and with biasing polarities as shown the gas tube control grid may be carried beyond cutoff for all values of the carrier.

Good results are obtained in monitoring keyed carrier waves with the system of Fig. 2, having the following specific component parts. The gas tube is the commercially known 2D21 Thyratron and the diodes are of the conventional metal envelope receiver type tube commercially designated the 6H6. Each 6H6 contains two anode-cathod assemblies and may serve for any two of the rectifiers shown. The short time constant circuit comprises 100,000 ohms and 100,000 micromicrofarads, respectively, for resistor 10 and condenser 11, while resistor 18 and condenser 17 are 1 megohm and 1 microfarad for the longer time constant. Filter resistors 13 and 20 may each be 1 megohm, and condensers 12 and 19, one microfarad each. The grid leak 26 is over 2 megohms and the grid condenser is 250 micromicrofarads. The voltage reducing resistor 15 is about 2 megohms. The potentiometers 22 and 23 are each 50,000 ohms and may have screw driver adjustments for the sliders.

My improved monitoring system is sensitive to abnormal carrier and/or modulating voltages of a signal source and will reliably indicate a carrier wave that is higher or lower than predetermined values and will indicate modulations that have failed or are beyond predetermined limits of voltage.

I claim:

1. A monitoring system for producing a certain output voltage when the carrier and modulation voltage waves in a modulated carrier are of abnormal value, comprising: a monitoring signal output channel, a source of monitoring signal voltage, relay means for coupling said source with said output channel, a detector device coupled with a source of modulated carrier voltage, and relay actuating means coupled with the output of said detector device and connected to operate said relay means, biasing means comprising a first circuit responsive to modulated carrier voltage for producing a first control voltage linearly variable with the average modulation intensity of said waves and a second circuit responsive to modulated carrier voltage for producing a second control voltage linearly variable with the carrier intensity up to a given carrier intensity and then substantially constant above said given carrier intensity, means for combining said first and second control voltages differentially, said relay means responsive to said differentially combined voltages.

2. In a monitoring system, a source of monitoring voltage a monitoring signal output channel, relay means for coupling said source with said channel, a source of modulated carrier voltage, a demodulator coupled with said source of modulated carrier voltage, and a relay actuating means coupled with the output of said demodulator and connected to actuate said relay means, said relay actuating means including a grid controlled gas tube and means for biasing said tube to cause firing thereof when the output of said demodulator is abnormal due to abnormalities in said modulated carrier voltage comprising a first detector circuit having a short time constant with respect to the modulation frequency coupled to said source of modulated carrier voltage, means for integrating the output of said first detector circuit to product a first direct control voltage linearly variable with the average modulation intensity of said modulated voltage, a second detector circuit having a relatively long time constant and coupled to said source of modulated voltage, means for integrating said second detector circuit output to derive a second direct control voltage linearly variable with the average carrier intensity, means for limiting said second control voltage, means for combining said first control voltage and said limited second control voltage differentially, said means for biasing said tube comprising means for applying said differentially combined voltages to said tube.

3. In a monitoring system for delivering a monitoring output voltage only when a modulated carrier voltage wave has normal voltage components, a carrier voltage demodulator for producing an output proportional to the modulation component of said carrier voltage wave, first and second rectifiers coupled to said demodulator output, a first resistance-capacitance filter coupled to said first rectifier and having a time constant short compared with the modulation frequency, a second resistance-capacitance filter coupled to said second rectifier and having a time-constant long compared with the modulation frequency, a voltage limiter connected across said second filter, a voltage combining circuit for differentially combining the outputs of said filters, a grid controlled gas tube having its control grid coupled with the output of said voltage combining circuit for controlling the firing and extinguishing of said tube, and means actuated by said tube to deliver a monitoring output voltage signal.

4. In a monitoring system, a source of carrier modulations, a first rectifier coupled to said source of modulations, a time-constant circuit coupled to said first rectifier, the time constant of said circuit being short compared with the modulation frequency; a second rectifier coupled to said source, a second time-constant circuit coupled to said second rectifier, the time constant of said second time constant circuit being long compared with the modulation frequency, means for limiting the output of said second time constant circuit, means for combining said first time constant circuit output and said limited second time constant circuit output differentially, an indicator and means for applying said differentially combined outputs to said indicator.

5. A monitoring system for a transmitter of signal waves, comprising a grid controlled gas tube, a first and a second biasing resistor serially connected in the grid circuit of said tube, a first rectifier and a source of said waves connected across said first resistor, a second rectifier and said source of waves connected across said second resistor, means for increasing the time constant of the circuits of said second rectifier to a value greater than the time constant of said first rectifier.

6. The monitoring system defined in claim 5, said rectifiers being so polarized as to produce opposing direct current voltages in said resistors.

7. The monitoring system defined in claim 5, comprising a voltage limiting device coupled across said second resistor.

8. The monitoring system defined in claim 5, comprising a first and a second filter network coupled, respectively, across said first and said second resistor.

9. The monitoring system defined in claim 5, comprising a first and second filter network coupled, respectively, across said first and said second resistor, and a voltage reducing resistor and a switch connected in series across said first filter network.

10. A monitoring system for signal waves comprising a biased relay, two resistance circuits connected in series in the input circuit of said relay, means producing a direct current in one resistance circuit proportional to the peak values of said signal waves, means producing a direct current in the other resistance circuits proportional to the average value of said signal waves, the direct current in the said two resistance circuits flowing in opposite directions, said monitoring system comprising a current limiting device in circuit with one of said resistors.

JOHN F. BACHMANN.

REFERENCES CITED

The following references are of record in the file of this patent:

UNITED STATES PATENTS

| Number | Name | Date |
|---|---|---|
| 1,663,086 | Long | Mar. 20, 1928 |
| 2,079,446 | Goldsmith | May 4, 1937 |
| 2,362,830 | Kline | Nov. 14, 1944 |
| 2,451,361 | Smith | Oct. 12, 1948 |